(12) United States Patent
Madhusudhana et al.

(10) Patent No.: US 7,136,489 B1
(45) Date of Patent: Nov. 14, 2006

(54) METHOD AND SYSTEM FOR ENHANCING NETWORK SECURITY USING A MULTILATERAL AUTHORIZATION MECHANISM

(75) Inventors: Honnuduke S. Madhusudhana, Bangalore (IN); Shishir Nagaraj, Bangalore (IN); Aridaman Tripathi, Mussoorie (IN)

(73) Assignee: Novell, Inc., Provo, UT (US)

( * ) Notice: Subject to any disclaimer, the term of this patent is extended or adjusted under 35 U.S.C. 154(b) by 860 days.

(21) Appl. No.: 10/242,176

(22) Filed: Sep. 12, 2002

(51) Int. Cl.
*H04L 9/00* (2006.01)
*G06F 7/04* (2006.01)

(52) U.S. Cl. .................. 380/277; 380/278; 380/279; 726/16; 726/17; 726/18; 726/19

(58) Field of Classification Search ................ None
See application file for complete search history.

(56) References Cited

U.S. PATENT DOCUMENTS

| | | | |
|---|---|---|---|
| 5,432,852 A * | 7/1995 | Leighton et al. | 380/30 |
| 5,588,061 A * | 12/1996 | Ganesan et al. | 380/30 |
| 5,604,804 A * | 2/1997 | Micali | 713/157 |
| 5,610,982 A * | 3/1997 | Micali | 713/157 |
| 5,675,649 A * | 10/1997 | Brennan et al. | 380/286 |
| 5,825,880 A * | 10/1998 | Sudia et al. | 713/180 |
| 5,937,066 A * | 8/1999 | Gennaro et al. | 380/286 |
| 6,212,281 B1 * | 4/2001 | Vanstone | 380/282 |
| 6,411,716 B1 * | 6/2002 | Brickell | 380/286 |
| 6,701,434 B1 * | 3/2004 | Rohatgi | 713/168 |
| 6,704,867 B1 * | 3/2004 | Cordery | 713/165 |
| 6,731,755 B1 * | 5/2004 | Cocks | 380/30 |

OTHER PUBLICATIONS

L. Harn, "Group-oriented (t,n) threshold digital signature scheme and digital multisignature", IEE Proc.-Computers and Digital Techniques, vol. 141, No. 5, Sep. 1994, pp. 307-313.*
Bruce Schneier, "Applied Cryptography", second edition, 1996, pp. 508-510.*
Shamir, Adi, "How to Share a Secret", Massachusetts Institute of Technology, Communications of the ACM, vol. 22, No. 11, Nov. 1979, pp. 612-613.
Desmedt, Y and Frankel, Y., *Threshold Cryptosystems*, Advances in Cryptology, Crypto '89, Edited by Giles Brassard, Springer-Verlag, pp. 456 and 458-469.

* cited by examiner

*Primary Examiner*—Kim Vu
*Assistant Examiner*—Ponnoreay Pich

(57) ABSTRACT

A method and system is provided for implementing a multilateral authorization quorum in a computer network. The authorization quorum comprises a total number of stakeholders out of which a threshold number of stakeholders can provide a multilateral authorization. To implement this multilateral authorization quorum, one or more access sets is first determined, each containing the threshold number of stakeholders. Since the stakeholders split a quorum private key, the shares of the quorum private key for each stakeholder in all access sets are determined. The shares of the private key held by the stakeholders in any one access set add up to a number directly related to the private key. One or more secret keys of the stakeholders are further determined for each access set. One or more polynomials for the access sets are then generated by using the shares of the private key and the secret keys thereof, wherein the private key is thus split among the stakeholders of the multilateral authorization quorum. Such a multilateral authorization quorum is ready to be used for making approvals for predetermined transactions.

41 Claims, 3 Drawing Sheets

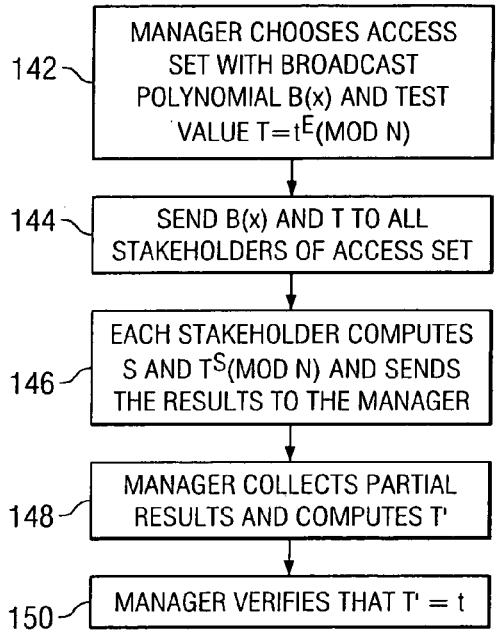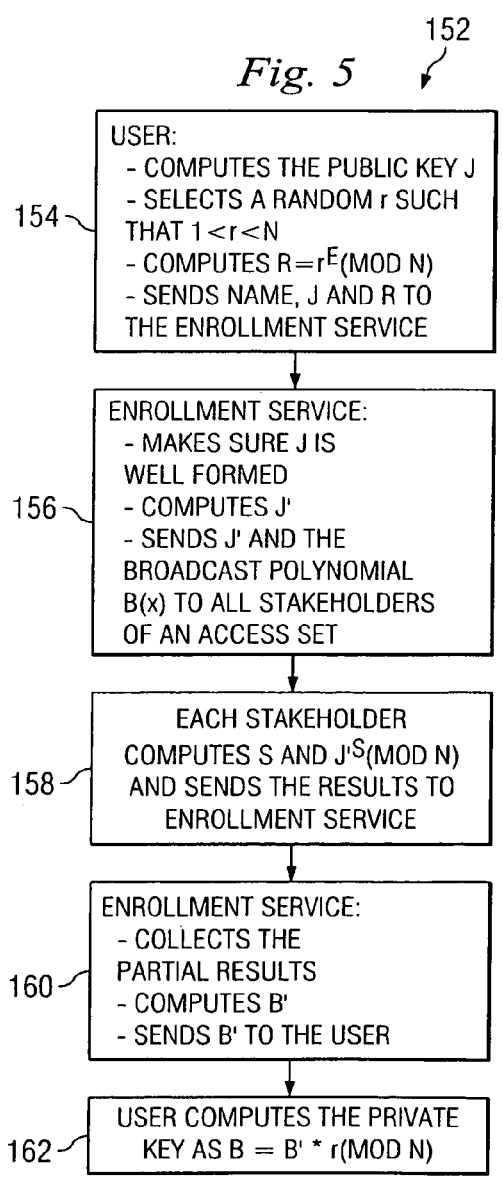

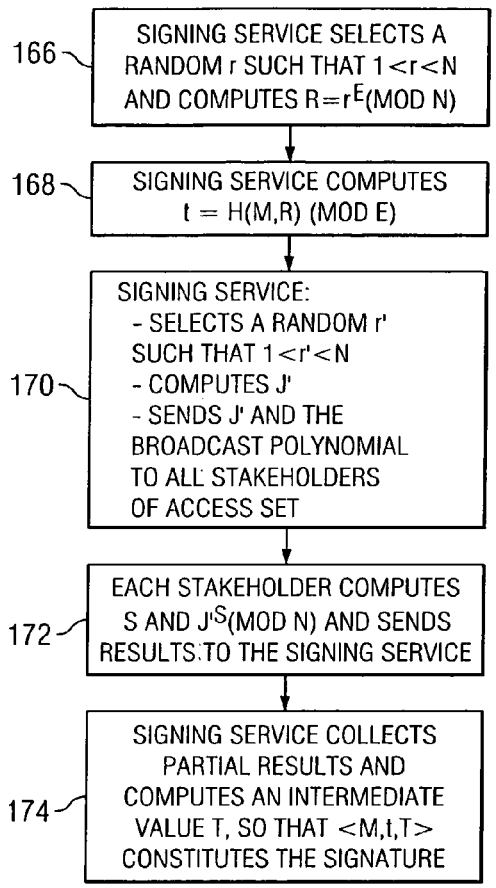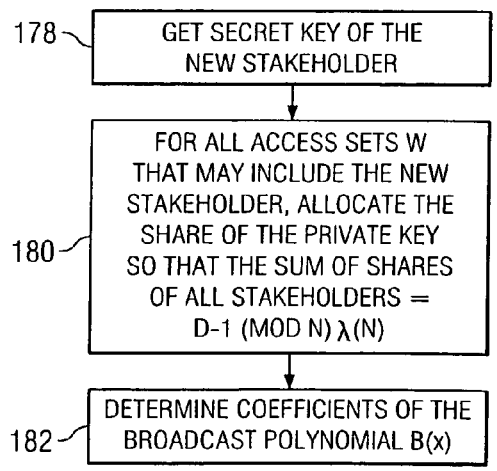

METHOD AND SYSTEM FOR ENHANCING NETWORK SECURITY USING A MULTILATERAL AUTHORIZATION MECHANISM

CROSS-REFERENCE

This application is related to U.S. patent application Ser. No. 10/082,854, filed on Feb. 25, 2002.

BACKGROUND

This disclosure relates generally to techniques for enhancing security in a computer network system, and more specifically, to a system and method for ensuring the security and integrity of transaction authorization using a multilateral authorization mechanism in the computer network.

With sophisticated computer networks utilized in many businesses and organizations, complicated tasks are performed almost every second. These tasks are frequently associated with authorization or permission requirements from a network management entity. The network management entity is responsible for administrative control functions such as the configuration and access control of networked resources used to carry out the tasks. Accordingly, administrative control is usually pre-specified in the form of policies and is used to determine whether a user has authorization to access an allocated resource.

Conventional computer systems generally have a trusted policy administrator responsible for instituting and controlling polices for authorizing operations that involve a resource or service. However, entrusting a single individual with such responsibility provides a possible route for exploitation of a system. For example, if the administrator has the authority to single handedly create or modify service or resource policies, he or she can abuse the authority for malicious purposes.

One solution for overcoming the need to trust an administrator involves the use of signed code modules, but this solution is generally inadequate as it places unilateral trust in a signer of the module. Accordingly, administrators colluding with the signer can subvert system policies. Moreover, code module signing methods generally need a substantial investment of time and finances during initial implementation and further investments for continuous maintenance.

Therefore, what is needed is a method and system for implementing secure policy or authorization control mechanisms operable to prevent a few administrators working together from subverting necessary policies. It is thus desirable to reduce or eliminate the trust placed on code modules. It is also desirable to support multiple administrators without needing drastic changes in functionality of the existing computer network's administrative system. It is further desirable to implement this method by distributing authorization among a quorum of stakeholders and obtaining a collective consent in a timely fashion to facilitate various computer processes in the computer network.

SUMMARY

In response to these and other problems, a method and system is provided for ensuring the security and integrity of policy mechanisms embodied in a computer network environment. The method and system may be implemented as a policy infrastructure such as a multilateral authorization system, which may combine features of a public key system and features of a shared secret key to provide policy security and integrity.

In one embodiment, a method and system is provided for implementing a multilateral authorization quorum in a computer network. The authorization quorum comprises a total number of stakeholders out of which a threshold number of stakeholders can provide a multilateral authorization. To implement this multilateral authorization quorum, one or more access sets is first determined, each containing the threshold number of stakeholders. Since the stakeholders split a quorum private key, the shares of the quorum private key for each stakeholder in all access sets are determined. The shares of the private key held by the stakeholders in any one access set add up to a number directly related to the private key. One or more secret keys of the stakeholders are further determined for each access set. One or more polynomials for the access sets are then generated by using the shares of the private key and the secret keys thereof, wherein the private key is thus split among the stakeholders of the multilateral authorization quorum. Such a multilateral authorization quorum is ready to be used for making approvals for predetermined transactions.

BRIEF DESCRIPTION OF THE FIGURES

FIG. 4 is a flowchart illustrating a method for share verification that may be implemented in the system of FIG. 1.

FIG. 5 is a flowchart illustrating a method for enrolling a user that may be implemented in the system of FIG. 1.

FIG. 6 is a flowchart illustrating a method for threshold signature generation that may be implemented in the system of FIG. 1.

FIG. 7 is a flowchart illustrating a method for computing a broadcast polynomial during new stakeholder enrollment that may be implemented in the system of FIG. 1.

DETAILED DESCRIPTION

Figure 1:
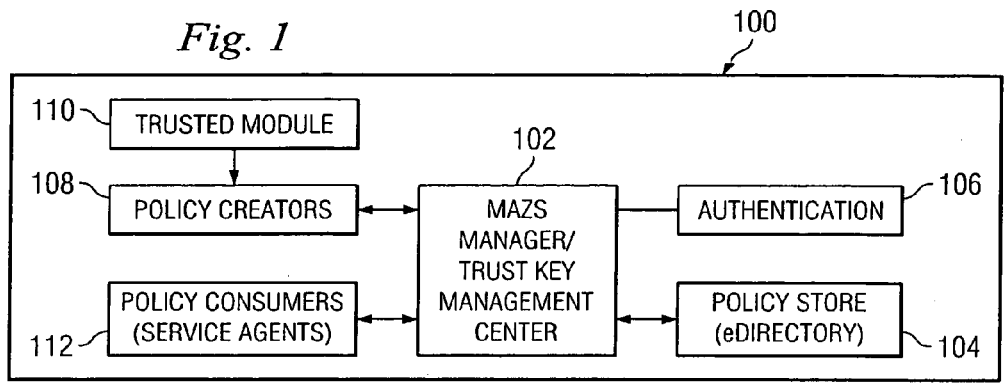
FIG. 1 is a schematic of components comprising an exemplary multilateral authorization system.

The present disclosure relates generally to mechanisms for ensuring the security and integrity of process authorization using a multilateral authorization system embodied in a computer network environment. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

For illustration purposes, a computer network having a database system and a predetermined administrative system including authorization and authentication mechanism such as a directory system (e.g., the eDirectory provided by Novell of Provo, Utah) is used below to explain an environment in which the present disclosure can be applied.

Furthermore, it is assumed that the administrative system has a set of stakeholders forming a quorum, which is further implemented by specifications or authorization schemes such as a scheme to require a minimum number of stakeholders (e.g., a threshold number) to authorize a particular transaction or process. One such implementation of a method and system utilizing authorization schemes dealing with multiple mutually non-trusting stakeholders is illustrated in U.S. patent application Ser. No. 10/082,854, filed on Feb. 25, 2002, and entitled "METHOD AND SYSTEM FOR AMASSMENT OF AUTHORIZATION IN A COMPUTER SYSTEM," which is hereby incorporated by reference in its entirety. In another embodiment, it is envisaged that the stakeholders are computer system administrators, and the quorum based authorization system is referred to as a Multilateral Authorization System (MAZS). In the illustration below, various terms of security key system may be mentioned, it is noticed that a private key is associated with a corresponding public key. A secret key, on the contrary, may not have such a public counterpart.

Referring to FIG. 1, in one embodiment, a Multilateral Authorization System (MAZS) 100 illustrates an authorization or policy infrastructure in which secure authorization control mechanisms may be implemented. The MAZS 100 serves to combine a public key cryptosystem for assuring identification with secret key splitting cryptographic mechanism to enhance the security and integrity of the authorization process. Components of the MAZS 100 include a manager 102, a policy store (e.g., an eDirectory) 104, an authentication module 106, a group of policy creators 108, who may be associated with one or more trusted process modules 110 of the computer network, and a group of policy consumers 112. It is noted that the term "policy" is used as an example for all kinds of transactions or processes in the computer network.

The MAZS manager 102 is operable to facilitate operations related to policy/authorization creation, storage, and consumption. Furthermore, the MAZS manager 102 may perform computations related to various aspects of policy processing before invoking the policy store 104 for management and storage operations. For example, the MAZS manager 102 may enable policy creation through various quorums, ensure the integrity of policy data stored in the policy store 104, prevent undetectable policy modification by a policy store administrator who has supervisor rights to the policy store 104, prevent a policy store administrator from subverting a required quorum by inducting new members or by removing old members, and either reduce or remove previous dependencies on trusted code modules.

The MAZS 100 may be set up using a one-time operation that begins with the establishment of a quorum of policy creators or administrators, where each policy creator is a stakeholder. The stakeholders are each given their private key shares to enable them to participate in quorum operations such as enrolling other stakeholders/users or policy signing. A trusted module 110 of a key share management center sets up any cryptographic parameters required for the MAZS manager 102 and carries out computations based on the private key shares of stakeholders.

The MAZS 100 assumes that all the stakeholders possess appropriate shares of the private key when participating in the quorum computation. In this sense, the authentication is implicit. The MAZS 100 can work with any authentication infrastructure provided in the network to authorize any operation which requires collective authentications or approvals of stakeholders of an associated quorum.

The policy store 104 has high availability and single-point management features. However, it may not allow for policy changes under the joint control of a policy store administrator and an application administrator, and may combine the quorum-based authorization afforded by the MAZS 100 with single-point management capabilities afforded by the policy store 104 for policy addition, removal, and modification operations. The integrity of each policy is ensured by a quorum signing process. In practice, the quorum may include administrators from different sectors of the computer network such as the policy store or directory service group and the application server administration group. Moreover, the policy store 104 may provide authentication of stakeholders themselves who constitute the quorums in the MAZS 100.

Figure 2:
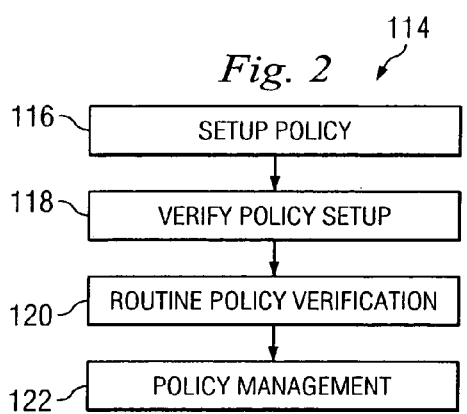
FIG. 2 is a flowchart illustrating the implementation of an exemplary application server agent in the system of FIG. 1.

Referring now FIG. 2, a method 114 for authorizing an exemplary application server agent using the MAZS 100 of FIG. 1 is illustrated. In the present example, the agent is an Audit Agent that reads audit policies out of an operating management server such as a Directory Server and audits network events accordingly. This creates a conflict where the policy store administrator cannot be trusted for the integrity of the stored audit policies. Accordingly, it may be desirable to use multiple administrators to control changes to audit policies, rather than a single administrator. In the present example, a group/quorum referred to as the Policy Change Control Group (PCCG) is formed of policy store administrators and Audit Agent administrators. All members of the PCCG are assumed to have access to the storage independent from the other members of the PCCG. Similarly, the application server agents are assumed to have separate and independent access to the storage aside from members of the PCCG. Therefore, hosts or servers on which applications are run are trusted hosts.

The method 114 begins in step 116 with the creation or setup of a policy, which includes establishing mechanisms to institute a quorum for policy creation and procedures to get a policy approved. The approved policies should be signed by the quorum before being stored in the policy store 104. As the quorum authorization depends both on approval from stakeholders and certain predetermined system policy directives, the policies are stored in the policy store 104 and retrieved when necessary. Because a policy may be modified or deleted as desired by an organization and the stakeholders constituting the quorum for making such a decision may change over time, the MAZS 100 should take these factors into account while providing a transparent authorization service. The policy addition/deletion process for multilateral authorization should ensure representative participation of all the concerned parties in a related quorum. The process should be fair while not permitting any party to impersonate or simulate a centralized authority.

A created policy may be in place for differing periods of time and may be distinguished as critical or non-critical. The violation of a critical policy is generally more damaging than the violation of a non-critical policy. Accordingly, the approval of a critical policy generally involves active participation of more stakeholders than the approval of a non-critical policy.

For critical policies, the approval process may involve "out-of-band" elements. "Out-of-band" indicates that decisions are made separately from or outside of the network. For example, the decisions may be made in a meeting, through lobbying, or through other means. It is noted that non-critical policies may also be formed out-of-band for purposes of convenience, resolution of policy differences between members, and similar reasons. Once the decisions have been made, the stakeholders are able to register their approval through their respective signatures.

It is noted that, in some situations, it may be desirable to create an oversight quorum of designated individuals, such as administrators from the policy store group and the application server administration group, for creating critical policies and forming department-specific and need-based quorums. The oversight quorum (referred to herein as the org-main quorum) may then create department-specific quorums to formulate non-critical policies related to their specific area of responsibility. If desired, the oversight quorum may maintain additional control by retaining approval/rejection power over the department-specific policies.

Continuing the PCCG example, the policy setup of step 116 begins with the members of the PCCG deciding the initial contents of a policy out-of-band from the MAZS. Once the decisions have been made and as will be described later in greater detail, a trusted key share management center in the MAZS manager 102 determines a common modulus and its factors, and also determines a key generation process using MAZS tools to get a PCCG public key. The PCCG public key is handed over to all members of the PCCG. In return, the trusted key share management center then receives distinct secrets from each stakeholder, forms access sets, and splits the corresponding private key among stakeholders of a selected access set. The trusted key share management center further determines a broadcast polynomial for each access set comprising required number of stakeholders. In case the trusted key share management center does not co-locate with the MAZS, the detailed information about the access set and their respective broadcast polynomials are sent to the MAZS manager.

After the policy is set up in step 116, the method 114 continues to step 118, where the policy setup is verified. Verification of the policy setup includes allowing the MAZS manager to select any access set with the appropriate broadcast polynomial and initiate a test to check the integrity of the private shares of the PCCG private key. The MAZS manager then selects a policy and requests a signature for the policy from the chosen access set. The policy signature may be verified using the PCCG public key.

Although illustrated in step 120, routine policy verification may occur at any of a plurality of times by using the public key that has been placed on the local secure storage area on the agent's host. The agent uses the public key to verify the integrity of the policy against unauthorized changes each time the policy is accessed. None of the members of PCCG are expected to have access to the particular storage area on the agent's host.

In step 122, a variety of policy management processes may be executed. Policy management may include a number of different functions to enable either policy modification (e.g., the alteration/addition/deletion of a policy) or the alteration of a group of associated stakeholders (e.g., enrolling or removing a stakeholder). These are processes by which changes may be made after a policy is created. Policy management involves storing the policy data in the policy store 104, which may be done for reasons such as high availability and ease of single-point management. The MAZS manager 102 may serve as the front-end for all policy related processing in the policy store 104 and so may perform operations such as add/modify/delete or search.

Policy modification may use an established rule that a majority of PCCG members need to agree on a change to be made. This "threshold authorization" is indicated by having a certain number of members each use their correct share to carry out the necessary computations and return the partial results to the MAZS manager 102. The MAZS manager 102 then implements the change by generating a quorum signature for the new policy, and thereafter, storing it in the policy store 104. It is noted that the MAZS manager 102 is trusted by the stakeholders during policy signing, but has no power to modify the policy without first getting partial results from the threshold number of members of PCCG.

One security concern is a policy store administrator's supervisor rights to the policy store 104, which may allow undetectable and malicious policy modification. For example, an administrator may use loadable modules and/or improper access rights to modify policies. One solution may simply involve encrypting the policies. However, for reasons of efficiency and the fact that policies should be publicly readable, encryption may be undesirable. Another possible solution is to ensure the integrity of policy data based on a quorum-based digital signature by the policy creators. Then the policy consumers have to make sure first that the policy integrity is intact before they can safely proceed according to the policy. However, the integrity verification based on quorum-based signatures depends on the integrity of the associated public key. A malicious administrator or an attacker can subvert the process of integrity verification by replacing the public key and inserting the bogus signature on the modified policy data in an undetectable manner. A method must be provided for handling this concern.

Another security concern is a policy store administrator's ability to subvert a quorum by inducting new members or removing old members of policy creator quorum. This concern may be handled by allowing quorum-based enrollment/disenrollment of new members to a quorum, which prevents a policy store administrator from removing or adding members to the policy creator quorum.

Often times, a member of a quorum responsible for critical policy creation may decide to leave an organization. The quorum should provide appropriate mechanism for removing an existing member and adding a new member. Furthermore, the process of adding/removing a quorum member should be transparent to the end users while maintaining integrity and consistency of the policy addition/deletion process.

The following description and related FIGS. 3–7 describe exemplary techniques for implementing particular policy process operations, such as enrollment, signing, etc. utilizing a quorum requiring approvals from a threshold number of stakeholders. As such, the mechanisms may also be referred to as "threshold techniques," "threshold approval," "threshold authorization," or other similar terms below. The threshold techniques can be employed for performing required quorum-based cryptographic operations. These techniques generally need appropriate representation of entities such as the stakeholders and the quorums. In the following examples, the org-main quorum having oversight authority as previously described will be used as one example for purposes of illustration.

Two different representation schemes are possible, namely, a certificate-based scheme and an identity-based scheme. The certificate-based scheme provides a means for assuring the identity of an entity through a public key contained in a signed certificate, but requires someone to play the role of certification authority. An administrator may serve as certification authority, but this is a role that is generally unfamiliar and so may require changes in the administrator's functionality.

In the present example, the identity-based scheme is used to represent the entities. Such a scheme may be based on an alternative public key scheme, such as an identity-based public key (IDPKC) scheme. In the identity-based scheme, the public key of an entity is obtained based on the individual/group name and other public information associated with the entity. For example, the public key of a stakeholder may be based on a name, network address, telephone number, physical address, or any other public information of the stakeholder, and a private key can be computed based on the knowledge of the corresponding public key.

Such identity-based schemes (e.g., public key systems) are generally based on a common modulus that is product of two large primes. The security of such a scheme is based on the difficulty of factoring the common modulus, which should be chosen to be practically infeasible. The trusted key share management center is constituted to facilitate setting up of the common modulus, the public parameters, and other secret parameters of the system. In the present example, this may involve an out-of-band mechanism for enabling stakeholders to agree on the modulus, the factorization, and other public parameters.

Figure 3:
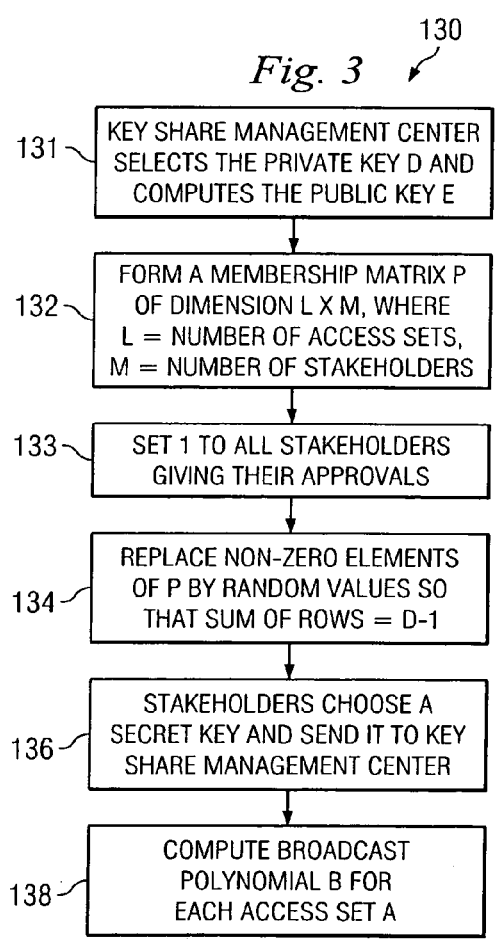
FIG. 3 is a flowchart illustrating a method providing threshold authorization that may be implemented in the system of FIG. 1.

Referring now to FIG. 3, in one embodiment, a method 130 is illustrated for providing a threshold authorization. The method 130 depends on a private key "D", which may be selected by the key share management center in step 131. The private key D is then used to determine a related value D−1. For example, if the private key D is 31, then D−1 (known only to the MAZS manager 102) is 30. The simple relation between the private key D and the value D−1 is referred to as a direct relation with no complicated mathematical calculation needed. It is understood though, D−1 is only one simplest example, not the only direct relation by any means.

In step 132, in one embodiment, to perform a (K, M)-threshold (i.e., a threshold approval mechanism requiring K number of approvals out of M number of stakeholders) cryptographic computation, D−1 is first divided into K even nonzero integers $S_i$ ($0 \leq i < K$) such that $\Sigma(0 \leq i < K)$ $S_i \equiv D-1$ (mod $\lambda(N)$), where the common modulus N is chosen to be product of two strong primes p and q such that N=p*q. The strong prime condition implies that p=2*p'+1 and q=2*q'+1 where p' and q' are also primes and conform to the Euler's totient function $\phi(N)=(p-1)*(q-1)=4*p'*q'$. For any nonzero integer M<N and not having nontrivial common factors with $\phi(N)$, then $M^{\phi(N)} \equiv 1$ (mod N). It is then convenient to work with a Carmichael function defined as $\lambda(N)$=LCM((p−1), (q−1)), which is $\lambda(N)=2*p'*q'$. Again, for an appropriate nonzero integer M<N and not having nontrivial common factors with $\lambda(N)$, $M^{\lambda(N)} \equiv 1$ (mod N). Mathematically, if E denotes a system/quorum public key and D denotes the corresponding system/quorum private key, E and D should satisfy the relation $E*D \equiv -1$ mod $\lambda(N)$.

Mathematically, assume $U=\{P_1, P_2, \ldots, P_M\}$ represents stakeholders. For any nontrivial subset B of U, mathematically, |B|=K. That is, the access set contains K number of stakeholders out of the total number M stakeholders that are needed for authorization. Various access sets may be formed of different groups of K number of stakeholders. For convenience, B is referred to as a K-subset. It is well known that there can be at the most $^MC_K$ K-subsets. The mathematical symbol $^MC_K$ denotes a number of possible combinations when K members are chosen from a quorum of M members. For each access set, only when K stakeholders give authorization, the private key D can be reconstructed from different shares of the private key held by the stakeholders.

The $^MC_K$ (=L) number of access sets can make a matrix having L number of access sets $A_x$ and M number of stakeholders. In step 133, if the i-th access set $A_1$ has stakeholder j as a member giving approval, then the (i, j)-th element of the membership matrix P, whose columns may be indexed by identifiers of the stakeholders and whose row may be indexed by identifiers of the access sets (as shown in Table 1 below), is set to a non-zero value such as an integer "one," otherwise the element is set to zero. In step 134, the non-zero elements are replaced by random values (e.g., the integers $S_i$ from step 132) such that the sum of the integers in any access set (or the rows of the matrix) is (D−1)/2 modulo $\lambda(N)$ and P is multiplied by 2. The elements $P_{1,j}$ of P then satisfy $$\forall i(0 \leq i < L); \Sigma_{(0 \leq j < M)} P_{1,j} \equiv D-1 (\text{mod } \lambda(N)).$$

Continuing to step 136, the jth stakeholder chooses a distinct odd integer $Z_J$ for $0 \leq j < M$ as his share, and sends it to the key share management center. In step 138, for each access set $A_1$, for $0 \leq i < L$, the broadcast polynomial $B_{A1}(x)$ ($0 \leq j < L$) is computed from the relationship $B_{Ai}(Z_k)=P_{i,k}$ where $Z_k \in A_i$. Accordingly, the expression for the polynomial is $$B_{A1}(x)=\Sigma_{(0 \leq i < K)} C_1 \Pi_{0 \leq j < M \text{ and } j \ne i)}(Z_i-Z_J)$$
$$\Pi_{(j \ne i \text{ and } j \in Ai)}(x-Z_J)(\text{mod } \lambda(N))$$

where, $$C_i = B_{A1}(Z_1)/\Pi_{(0 \leq j < M \text{ and } j \ne i)}(Z_i-Z_j)(\text{mod } \lambda(N)/2).$$

In order to further explain the above described mechanism, consider a (3,5)-threshold scheme with 7 access sets 'A1'–'A7', wherein three out of five stakeholders in a quorum must give authorization. It is assumed that the common modulus and its two primes bear the relation: N=1081=23*47, and $\lambda$ (N)=2*11*23=506. The system's public key is selected as 49, and the private key D is 31, while D−1 is 30. The stakeholders are 'a', 'b,' 'c,' 'd,' and 'e.' The membership matrix P is shown below in Table 1:

|   | a | b | c | d | e |
|---|---|---|---|---|---|
| A1 | 6 | ... | 8 | 16 | ... |
| A2 | ... | 4 | 6 | ... | 20 |
| A3 | 4 | 10 | ... | 16 | ... |
| A4 | ... | 6 | 14 | 10 | ... |
| A5 | ... | ... | 12 | 8 | 10 |
| A6 | 12 | ... | ... | 2 | 16 |
| A7 | 2 | 10 | ... | ... | 18 |

Table 1

It can be verified that the sum of the elements in a row adds to 30 (mod 506). Let a=5, b=11, c=21, d=13, and e=17, which are referred to as the secrets or secret keys $Z_J$ for corresponding stakeholders. The broadcast polynomial $B_{A1}$ (X) (or $B_{A1}(Z_j)$) for A1 has to be computed such that $B_{A1}(5)=6$, $B_{A1}(21)=8$, and $B_{A1}(13)=16$. The values 6, 8 and 16 may be deemed as the shares of the private key held respectively by stakeholders a, c, and d. Plugging in these values to find the coefficients resulting in $C_1=239$, $C_2=17$, $C_3=87$, and $B_{A1}(x)=4(x-21)(x-13)+174(x-5)(x-13)+316(x-5)(x-21)$ (mod 506). When simplified, $B_{A1}(x)=(494*x^2-352*x+42)$. With the obtained broadcast polynomial $B_{A1}(x)= (494*x^2-352*x+42)$, the private key D is now considered split among three stakeholders of that access set whose shares can be added up to match the value D−1. In a similar manner, after a series of calculations, all access sets will have their corresponding polynomials.

In the described splitting scheme, a stakeholder does not need to know the modulus λ(N) in order to perform the necessary calculations. Furthermore, although, in the above example, that a stakeholder selects a distinct odd number for its secret key, it doesn't have to be restriction. Once the broadcast polynomial is transmitted, and when an authorization is needed, the stakeholders can compute the private key shares by passing their secret keys (which is shared with the trusted key management center) as arguments to the broadcast polynomial.

It is noted that in some embodiments, a stakeholder may need to store and manage as many as $^{M-1}C_{K-1}$ different shares, as well as an index of the combination to pick out the right share. However, in the above example, the splitting scheme is modified so that each stakeholder has exactly one secret key to be stored and managed. Each stakeholder can choose his secret key and entrust it to the key share management center. In addition, all the stakeholders belonging to a K-subset will be allotted a broadcast polynomial so that each stakeholder gets an intermediate value resulting from the polynomial by evaluating the broadcast polynomial with their individual secret key as an argument. In the immediate example above, if the polynomial $B_{A1}(x)=(494*x^2-352*x+42)$ is evaluated with the secret key x=5, the intermediate value "S" will be 10632. The intermediate value may be used as an exponent for the partial signature computation. It is also noted that to broadcast the polynomial, it is the coefficients of the broadcast polynomial that are transmitted to the respective stakeholders of a particular K-subset for enabling the quorum computation. In addition, the key splitting scheme described above may accommodate subsets of cardinality greater than K.

The key splitting scheme also enables verification of the allotted shares. This verification may be performed before a multilateral authorization is needed from the stakeholders or periodically as a system maintenance. Referring now to FIG. 4, a method 140 for verifying shares is illustrated. In step 142, the MAZS manager 102 first chooses an access set with the broadcast polynomial B(x) and a test value $T \equiv t^E$ (mod N), wherein "t" is any non-zero number less than N and does not have common factors with λ(N). The manager 102 then sends T and the broadcast polynomial B(x) to all stakeholders of the access set in step 144. The distinct secrets of stakeholders are $Z'_k (0 \leq k < K)$, where $Z'_k = Z_J$ for some j between 0 and M−1. In step 146, each stakeholder computes $S_k = B(Z'_k)$ ($0 \leq k < K$), computes $T_{Sk}$ (mod N) (which is also referred to as a partial signature of a contributing stakeholder), and sends $T^{Sk}$ (mod N) to the MAZS manager. The manager 102 collects the K partial results in step 148 and computes $T' = T * \Pi_{k=1}$ to K $T^{Sk}$ (mod N). In step 150, the manager 102 verifies that T'=t. If, in step 150, T' does not equal to t, the shares of the private key held by the stakeholders are not verified.

For instance, for the (3,5)-threshold scheme mentioned above, the MAZS manager 102 can choose t=53 and compute $T \equiv 53^{49}$ (mod 1081)=592. The manager sends T and the broadcast polynomial $B_{A1}(x)=(494*x^2-352*x+42)$ to stakeholders "a," "c," and "d" of access set A1. They respectively compute $S_a \equiv 592^6$ (mod 1081)=150, $S_c \equiv 592^8$ (mod 1081)= 570 and $S_d \equiv 592^{16}$ (mod 1081)=600. Then, the manager computes $592 * S_a * S_c * S_d \equiv 53$ (mod 1081). This verifies the integrity of threshold system private key D as well as the integrity of shares held by a, c and d.

An improved method is also needed to enroll the users of some application groups or non-administrative quorums. The system's (or org-main-quorum's) private key is useful for enrolling users and signing critical policies. The private key is split based on a (K, M)-threshold scheme as previously described to facilitate threshold cryptographic computations. In one example, the enrolled user has a public key and private key pair as required by the IDPKC system defined by Guillou Quisquater (GQ) security scheme.

The enrollment of a new user in a GQ-system means that a private key for the users needs to be computed. The public key of user J and his private key B are related mathematically by $J*B^E \equiv 1$ (mod N), where E is the system public key. In the present example, there are 'M' stakeholders for the org-main-quorum and at least K stakeholders need to agree for a new user to be enrolled. The MAZS manger receives a confounder and the public key from the new user and checks the correct formation of the public key, computes an intermediate result and invokes (K,M)-threshold private key computation based on the intermediate result. This involves the split authorities (e.g., the stakeholders) performing an exponentiation of a message using their respective shares and then securely transmitting the results to the manager 102 who combines the result multiplicatively to obtain the private key of the user. The manager then sends the private key to the new user. Accordingly, the process of adding or removing a user to a predetermined quorum is a multilateral decision and cannot be subverted by a few individuals.

Referring now to FIG. 5, a method 152 for enrolling a user in a GQ system using a (K, M)-threshold algorithm is illustrated. In step 154, a user computes a public key 'J' based on some predetermined public information such as his name. The user chooses a random number 'r' such that 1<r<N and computes $R = r^E$ (mod N). It is noted that R serves as a confounder to ensure that the MAZS enrollment service or an attacker is unable to obtain the user's private key. After computing R, the user sends his name, J, and R to the MAZS enrollment service.

In step 156, the MAZS enrollment service checks to ensure that J is well formed by re-computing the J if needed from public information. The MAZS enrollment service then computes J' such that $R*J*J^1 \equiv 1$ (mod N) and sends J' and the broadcast polynomial B (x) to all stakeholders of the chosen access set. The K distinct secret keys of stakeholders are $Z'_k (0 \leq k < K)$, where $Z'_k = Z_j$ for some j between 0 and M−1. In step 158, each stakeholder computes $S_k = B(Z'_k)$ ($0 \leq k < K$), computes $J'^{Sk}$ (mod N), and sends $J'^{Sk}$ (mod N) to the MAZS enrollment service. In step 160, the MAZS enrollment service collects the results of K partial computations, computes $B' = J^* * \Pi_{k=1}$ to $_K J'^{Sk}$ (mod N), and sends B' to the user. The user then computes his private key as B=B'*r (mod N) in step 162.

Continuing the above example of a (3,5)-threshold system, suppose a new user's public key is computed as 71 and his private key needs to be computed. The parameters E=49, D=31 and N=1081. The user selects the confound factor as r=3. The user sends $3^{49}$ (mod 1081)=450 and J=71 to the enrollment service (manager). The manager computes J'=813 such that $J'*450*71 \equiv 1$ (mod 1081). The manager sends J' and the broadcast polynomial $B_{A1}(x)=(494*x^2-352*x+42)$ to stakeholders a, c and d of access set A1. The stakeholders respectively compute $S_a \equiv 813^6$ (mod 1081)=841, $S_c \equiv 813^8$ (mod 1081)=947 and $S_d \equiv 813^{16}$ (mod 1081)=660. Based on these, the manager computes $813 * S_a * S_c * S_d \equiv 101$ (mod 1081), and sends this to the new user who then computes the private key as 101*3=303. It can be verified that $71*303^{49} \equiv 1$ (mod 1081).

Referring now to FIG. 6, in another embodiment, a method 164 is illustrated for generating threshold signatures in a GQ System (e.g., a (K, M)-Threshold signature algorithm for a GQ system). While the preceding text has described a quorum-based method where K out of M stakeholders are needed to generate a private key/signature, it is also possible that certain applications/processes require joint signatures from all stakeholders. This approach may involve greater coordination among the stakeholders than the previous approach, but the threshold signature verification is similar to verification with a single signature party. For example, taking the org-main quorum for example, there will be a specific public key of the org-main quorum for signatures, denoted by $J_{SIGN}$ and its corresponding private key $B_{SIGN}$.

In step 166, a MAZS signing service chooses a random 'r' such that $1<r<N$ and relatively prime to $\lambda(N)$. It then computes $R=r^E$ (mod N). In step 168, the signing service computes $t=H(M, R)$ (mod E), where M is the message being signed and $H(x)$ is a one-way hash function. The MAZS signing service then chooses another random r' such that $1<r'<N$ and relatively prime to $\lambda(N)$, computes J' such that $J'^*(J_{SIGN})^{t*}r'^E \equiv 1$ (mod N), and sends J' and the broadcast polynomial to all stakeholders of the chosen access set in step 170. It is noted that r' ensures that only the MAZS signing service can compute the collective signature. The K distinct secret keys of stakeholders are $Z'_k (0 \leq k < K)$, where $Z'_k = Z_j$ for some j between 0 and M-1. In step 172, each stakeholder finds $S_k = B(Z'_k) (0 \leq k < K)$, and computes $J'^{Sk}$ (mod N), and sends $J'^{Sk}$ (mod N) to the MAZS signing service. The MAZS signing service collects the K partial results and computes the intermediate value T as $T = r^*r'^*J'^*\Pi_{k=1\ to\ K} J'^{Sk}$ (mod N) in step 174. Accordingly, <M, t, T> constitutes the signature.

Still continuing with the example above with the (3,5)-threshold system, it is further assumed that $J_{SIGN}$ is chosen to be 173 and the corresponding private key is found to be 581. To perform GQ-signature, the chosen $r=101$ renders the computation $R \equiv 101^{49}$ (mod 1081)=813. Suppose the signing of message M is done without threshold operation, then that $t=H(M, R)$ (mod E)=$53 \equiv 4$ (mod 49). As per GQ-sign scheme $T=101*581^4$ (mod 1081)=578. The 3-tuple <M, 4, 578> then constitutes the signature.

To verify the signature, the manager computes $R' \equiv 578^{49}*173^4$ (mod 1081)=813=R. With this result, the verifier checks whether $H(M, R')=4$ (mod 49) stands. To perform the signing computation using the (3,5)-threshold scheme with $r=101$, $R=813$ and $t=4$, the manager can choose the confounder $r'=7$ and computes $J'=672$ such that $J'^*7^{49}*173^4 \equiv 1$ (mod 1081). Suppose the manager opts for the access set A1 with stakeholders a, c and d chosen with the broadcast polynomial $B_{A1}(x)=(494*x^2-352*x+42)$. The stakeholders compute their share as $S_a=672^6$ (mod 1081)= 606, $S_c=672^8$ (mod 1081)=430 and $S_d=672^{16}$ (mod 1081)= 49. It is noted that $S_a$, $S_b$, and $S_c$ are also deemed as the partial signatures of the corresponding stakeholders. The manager then computes $T'=101*7*672*606*430*49$ (mod 1081)=578, which is expected.

Referring now to FIG. 7, in still another embodiment, a method 176 for computing a broadcast polynomial for the addition (e.g., enrollment) of a new stakeholder is illustrated. In a quorum based system such as the MAZS 100, processes for the enrollment and disenrollment of stakeholders are needed to enable the MAZS 100 to deal with stakeholder changes. The stakeholders in any particular group may change for any of a variety of reasons. For example, a stakeholder may become ill, leave an organization, move to a different position, etc. Such changes may impact the number of stakeholders available to meet a predetermined threshold value. If the number of stakeholders falls below the threshold value, it may become impossible to perform threshold-based computations that require the participation of a certain number of stakeholders.

The previously described splitting algorithm enables simultaneous sharing of different secrets such as a private key, even though a stakeholder share is not changed. Accordingly, the algorithm can be used to issue shares when a new stakeholder is added/enrolled. Upon addition of one or more new members, new access sets are formed and corresponding new broadcast polynomials may be generated. The newly added stakeholders transmit their individual secret keys to the key share management center. The access sets may include old members, whose secret keys should not change as a result of a new member enrollment.

To begin, let $W=\{W_1, \ldots, W_D\}$ be the new access sets that include a new stakeholder. In step 178, the secret key associated with the new member is obtained as an odd integer $Z_{M+1}$. In step 180, for any access set $W_k \in W$, the share of the private key is allocated to satisfy the condition that the sum of shares of all stakeholders of $W_k$ adds to D-1 modulo $\lambda(N)$. This is done for all sets of W.

A number of relationships may be determined. For example, the K-1 distinct secret keys of stakeholders for an access set $W_k$ are $Z'_k (0 \leq k < K-1)$, where $Z'_k = Z_j$ for some j between 0 and M-1. The shares for $W_k$ are $(s_1, \ldots, s_K)$, where the polynomial $B_{Wk}(x)$ satisfies $B_{Wk}(Z'_k)=Sk$ and $B_{Wk}(Z_{M+1})=S_{M+1}$. From these relationships, the coefficients of $B_{Wk}(x)$ may be determined in step 182. This is done for all sets $W_k \in W$.

In the event of a member being disenrolled, no change is required. The MAZS manager 102 should not select the access sets containing the disenrolled stakeholder as a member.

In still another embodiment, the detection of policy tampering may be detected as follows. The MAZS 100 needs the policy store server for storing signed policies. As described previously, the signed policy data is not encrypted for reasons of efficiency and ease of reading (e.g., public accessibility). However, a policy store system administrator, by virtue of supervisor access to the directory information base, may be able to easily replace or modify the signed policy data. If a malicious administrator wishes to change the data in an undetectable manner, either the private key for a specific quorum such as the org-main-quorum or the factorization of the common modulus needs to be broken. These are relatively difficult problems. As such, the integrity of this security system is maintained.

Alternatively, the administrator may attempt to replace the common modulus. However, with each administrator having a separate secure copy of the common modulus, such tampering of the modulus may easily be detected as the signatures are modified. An alternative method of choosing the org-main-admin public key is to determine it by taking a hash function of an executable file for the signature verification, which may be in a binary form. Because of the dependency of the verification code on the common modulus, the administrator will not be able tamper with the common modulus without being detected. Additional protection, such as storing the common modulus in an encrypted or obfuscated form on the host, may also be desirable.

While the preceding description shows and describes one or more embodiments, it will be understood by those skilled in the art that various changes in form and detail may be made therein without departing from the spirit and scope of the present disclosure. Therefore, the claims should be interpreted in a broad manner, consistent with the present disclosure.

What is claimed is:

1. A method for implementing a multilateral authorization quorum in a computer network, the multilateral authorization quorum comprising a total number of stakeholders out of which a threshold number of stakeholders can provide a multilateral authorization, the stakeholders sharing a quorum private key, the method comprising:

determining one or more access sets, each containing the threshold number of stakeholders;

determining a share of the quorum private key held by each stakeholder in all of the one or more access sets, wherein the shares of the quorum private key held by the stakeholders in any one of the one or more access sets add up to a number directly related to the quorum private key, wherein the quorum private key is split among the stakeholders of the multilateral authorization quorum, thereby forming the multilateral authorization quorum;

determining one or more secret keys of the stakeholders for each of the one or more access sets; and generating one or more broadcast polynomials for each of the one or more access sets using the shares of the quorum private key and the one or more secret keys thereof;

wherein the threshold number of stakeholders in the multilateral authorization quorum collectively generate a collective signature for a message in the computer network utilizing a Guillou-Quisquater public key security system, comprising:

computing a value $R=r^E \pmod{N}$ wherein r is a random number between 1 and integer N, and E denotes a public exponent thereof;

computing $t=H(M, R) \pmod{E}$, wherein M represents the message being signed by the stakeholders and $H(M, R)$ is a one-way hash function;

computing J' such that $J'^*(J_{SIGN})^{t}*r'^E \equiv 1 \pmod{N}$, wherein r' is a random number and $1<r'<N$ and $J_{SIGN}$ is the public key for the collective signature;

sending J' and a selected polynomial B(x) to all stakeholders in a selected access set;

computing a partial result $j'^{Sk} \pmod{N}$ by each stakeholder, wherein $S_k=B(Z'_k) (0 \leq k<K)$, $Z'_k$ denotes the secret key held by each stakeholder; and computing an intermediate value T as $T=r*r'*J'*\Pi_{k=1 \text{ to } K} J'^{Sk} \pmod{N}$, wherein a three-tuple <M, t, T> constitutes the collective signature of the threshold number of stakeholders.

2. The method of claim 1 wherein the shares of quorum private keys $S_i$ and a quorum private key D bear a mathematical relation $\Sigma_{(0 \leq i<K)} S_i \equiv D-1 \pmod{\lambda(N)}$, wherein $0 \leq i<K$, and K represents the threshold number, wherein $\lambda(N)$ is a Carmichael function of two strong primes p and q and $N=p*q$.

3. The method of claim 2 wherein the quorum private key D correlates with a public key E of the multilateral authorization quorum by a mathematical relation: $E*D \equiv 1 \mod \lambda(N)$.

4. The method of claim 2 wherein a first one of the one or more broadcast polynomials for an access set $A_i$ is mathematically represented as $B_{Ai}(x)=\Sigma_{(0 \leq i<K)} C_i \Pi_{(0 \leq j<M \text{ and } j \notin Ai)}(Z_i-Z_j) \Pi_{(j \neq i \text{ and } j \in Ai)}(x-Z_j) \pmod{\lambda(N)}$ wherein $C_i=B_{Ai}(Z_i)/\Pi_{(0 \leq j<M \text{ and } j \neq i)}(Z_i-Z_j) \pmod{\lambda(N)/2}$, where M represents the total number of stakeholders and $Z_i$ represents the secret key of the i-th stakeholder.

5. The method of claim 1 further comprising verifying that the quorum private key and the shares of the quorum private key held by the threshold number of stakeholders have not been tampered with.

6. The method of claim 5 wherein the verifying further includes:

providing a test value T corresponding to a broadcast polynomial B(x), the test value T being represented by $T \equiv t^E \pmod{N}$ for the access set, wherein t is a predetermined number and E represents a public key of the multilateral authorization quorum and N is a predetermined integer;

sending T and the broadcast polynomial B(x) to the stakeholders of the access set;

computing a partial result value $T^{Sk} \pmod{N}$ by each stakeholder, wherein $S_k=B(Z'_k)$, and $Z'_k$ is the secret key held by each stakeholder;

computing a value T' wherein $T'=T\Pi_{k=1 \text{ to } K} T^{Sk} \pmod{N}$; and verifying that T'=t, wherein if T' equals t, the shares of the quorum private key held by the threshold number of stakeholders have not been tampered with.

7. The method of claim 1 further comprising providing an authorization utilizing the one or more broadcast polynomials and the secret keys held by the stakeholders.

8. The method of claim 7 further comprising:

selecting at least one of the one or more broadcast polynomials based on the access set for which it was generated; and conducting one or more threshold cryptographic computations utilizing the at least one of the one or more broadcast polynomials and the secret keys.

9. The method of claim 7 wherein the multilateral authorization quorum is used for enrolling a new user in the computer network utilizing a Guillou-Quisquater public key security system, the enrolling requires approvals from the threshold number of stakeholders.

10. The method of claim 9 further comprising:

generating, by the new user, a public key J based on one or more predetermined parameters;

computing a value $R=r^E \pmod{N}$ wherein r is a random number between 1 and integer N, and E denotes a public exponent thereof;

computing a value J' such that $R*J*J' \equiv 1 \pmod{N}$; wherein J denotes the public key chosen by the new user;

sending J' and a selected broadcast polynomial B(x) to all stakeholders in an access set;

computing a partial result $j'^{Sk} \pmod{N}$ by each stakeholder, wherein $S_k=B(Z'_k) (0 \leq k<K)$, $Z'_k$ denotes the secret key held by each stakeholder;

computing $B'=J'*\Pi_{k-1 \text{ to }} K J'^{Sk} \pmod{N}$;

sending B' to the new user; and computing a distinctive share $B=B'*r \pmod{N}$ as a quorum private key for the new user corresponding to the public key J.

11. The method of claim 1 further comprising verifying the generated collective signature.

12. The method of claim 1 further comprising adding at least one new stakeholder to the multilateral authorization quorum by generating new polynomials for added access sets.

13. The method of claim 12 wherein the generating includes, for the added access sets:

selecting a secret key for the at least one new stakeholder;

reselecting the shares of the quorum private key for all stakeholders to satisfy the condition that, for each access set, D−1 (mod λ(N)), wherein D represents the quorum private key and λ(N) represents a predetermined modulus; and recalculating the one or more polynomials using the shares of the quorum private key and the selected secret keys.

14. A computer program product for implementing a multilateral authorization quorum in a computer network, the multilateral authorization quorum comprising a total number of stakeholders out of which a threshold number of stakeholders can provide a multilateral authorization, the stakeholders sharing a quorum private key, the computer program product stored on a computer-readable medium and comprising instructions for:

determining one or more access sets, each containing the threshold number of stakeholders;

determining a share of the quorum private key held by each stakeholder in all of the one or more access sets, wherein the shares of the quorum private key held by the stakeholders in any one of the one or more access sets add up to a number directly related to the quorum private key, wherein the quorum private key is split among the stakeholders of the multilateral authorization quorum, thereby forming the multilateral authorization quorum;

determining one or more secret keys of the stakeholders for each of the one or more access sets; and generating one or more broadcast polynomials for each of the one or more access sets using the shares of the quorum private key and the one or more secret keys thereof, wherein the multilateral authorization quorum is used for enrolling a new user in the computer network utilizing a Guillou-Quisquater public key security system, the enrolling requires approvals from the threshold number of stakeholders, the computer program product further comprising instructions for:

generating, by the new user, a public key J based on one or more predetermined parameters;

computing a value $R=r^E \pmod{N}$ wherein r is a random number between 1 and integer N, and E denotes a public exponent thereof;

computing a value J' such that $R*J*J' \equiv 1 \pmod{N}$; wherein J denotes the public key chosen by the new user;

sending J' and a selected broadcast polynomial B(x) to all stakeholders in an access set;

computing a partial result $J'^{Sk} \pmod{N}$ by each stakeholder, wherein $S_k = B(Z'_k) (0 \leq k < K)$, $Z'_k$ denotes the secret key held by each stakeholder;

computing $B' = J'^{*} \Pi_{k=1 \, to \, K} J'^{Sk} \pmod{N}$;

sending B' to the new user; and computing a distinctive share $B = B'^{*}r \pmod{N}$ as a private key for the new user corresponding to the public key J.

15. The computer program product of claim 14 wherein the shares of the private keys $S_i$ and the private key D bears a mathematically relation $\Sigma(0 \leq i < K) \, Si \equiv D-1 \pmod{\lambda(N)}$, wherein $0 \leq i < K$, and K represents the threshold number, wherein λ(N) is a Carmichael function of two strong primes p and q and $N = p*q$.

16. The computer program product of claim 15 wherein the quorum private key D correlates with a public key E of the multilateral authorization quorum by a mathematical relation: $E*D \equiv 1 \mod \lambda(N)$.

17. The computer program product of claim 15 wherein a first one of the one or more broadcast polynomials for an access set $A_i$ is mathematically represented as $B_{Ai}(x) = \Sigma_{(0 \leq i < K)} C_i \Pi_{(0 \leq j < M \, and \, j \notin Ai)}(Z_i - Z_j) \Pi_{(j \neq i \, and \, j \in Ai)}(x - Z_j) \pmod{\lambda(N)}$ wherein $C_i = B_{Ai}(Z_i) / \Pi_{(0 \leq j < M \, ad \, j \neq i)}(Z_i - Z_j) \pmod{\lambda(N)/2}$, where M represents the total number of stakeholders and $Z_i$ represents the secret key of the i-th stakeholder.

18. The computer program product of claim 14 further comprising instructions for verifying that the quorum private key and the shares of the quorum private key held by the threshold number of stakeholders have not been tampered with.

19. The computer program product of claim 18 wherein the instructions for verifying further include:

providing a test value T corresponding to a broadcast polynomial B(x), the test value T being represented by $T = t^E \pmod{N}$ for the access set, wherein t is a predetermined number and E represents a public key of the multilateral authorization quorum and N is a predetermined integer;

sending T and the broadcast polynomial B(x) to the stakeholders of the access set;

computing a partial result value $T^{Sk} \pmod{N}$ by each stakeholder, wherein $S_k = B(Z'_k)$, and $Z'_k$ is the secret key held by each stakeholder;

computing a value T' wherein $T' = T^{*} \Pi_{k=1 \, to \, K} T^{Sk} \pmod{N}$; and verifying that T' = t, wherein if T' equals t, the shares of the quorum private key held by the threshold number of stakeholders have not been tampered with.

20. The computer program product of claim 14 further comprising instructions for providing an authorization utilizing the one or more broadcast polynomials and the secret keys held by the stakeholders.

21. The computer program product of claim 20 further comprising instructions for:

selecting at least one of the one or more broadcast polynomials based on the access set for which it was generated; and conducting one or more threshold cryptographic computations utilizing the at least one of the one or more broadcast polynomials and the secret keys.

22. The computer program product of claim 20, wherein the threshold number of stakeholders in the multilateral authorization quorum collectively generate a collective signature for a message in the computer network utilizing a Guillou-Quisquater public key security system, comprising instructions for:

computing a value $R = r^E \pmod{N}$ wherein r is a random number between 1 and integer N, and E denotes a public exponent thereof;

computing $t = H(M, R) \pmod{E}$, wherein M represents the message being signed by the stakeholders and H(M, R) is a one-way hash function;

computing J' such that $J'^{*}(J_{SIGN})'^{*}r'^E \equiv 1 \pmod{N}$, wherein r' is a random number and $1 < r' < N$ and $J_{SIGN}$ is the public key for the collective signature;

sending J' and a selected polynomial B(x) to all stakeholders in a selected access set;

computing a partial result $j'^{Sk} \pmod{N}$ by each stakeholder, wherein $S_k = B(Z'_k)(0 \leq k < K)$, $Z'_k$ denotes the secret key held by each stakeholder; and computing an intermediate value T as $T = r^{*}r'^{*}J'^{*} \Pi_{k=1 \, to \, K} J'^{Sk} \pmod{N}$, wherein a three-tuple <M, t, T> constitutes the collective signature of the threshold number of stakeholders.

23. The computer program product of claim 22 further comprising instructions for verifying the generated collective signature.

24. The computer program product of claim 14 further comprising adding at least one new stakeholder to the multilateral authorization quorum by generating new polynomials for added access sets.

25. The computer program product of claim 24 wherein the instructions for generating includes, for the added access sets, instructions for:
- selecting a secret key for the at least one new stakeholder;
- reselecting the shares of the quorum private key for all stakeholders to satisfy the condition that, for each access set, $D-1 \pmod{\lambda(N)}$, wherein D represents the quorum private key and $\lambda(N)$ represents a predetermined modulus; and
- recalculating the one or more polynomials using the shares of the quorum private key and the selected secret keys.

26. A system for implementing a multilateral authorization quorum in a computer network, the multilateral authorization quorum comprising a total number of stakeholders out of which a threshold number of stakeholders can provide a multilateral authorization, the stakeholders sharing a quorum private key, the system comprising:
- a key share management center for determining one or more access sets, each containing the threshold number of stakeholders; for determining a share of the quorum private key held by each stakeholder in all of the one or more access sets, wherein the shares of the quorum private key held by the stakeholders in any one of the one or more access sets add up to a number directly related to the quorum private key; and for determining one or more secret keys of the stakeholders for each of the one or more access sets; and
- wherein the key share management center contains at least one memory,
- wherein the key share management center generates one or more broadcast polynomials for each of the one or more access sets using the shares of the quorum private key and the one or more secret keys thereof,
- wherein the threshold number of stakeholders in the multilateral authorization quorum collectively generate a collective signature for a message in the computer network utilizing a Guillou-Quisquater public key security system, the system further comprising means for:
  - computing a value $R=r^E \pmod{N}$ wherein r is a random number between 1 and integer N, and E denotes a public exponent thereof;
  - computing $t=H(M, R) \pmod{E}$, wherein M represents the message being signed by the stakeholders and $H(M, R)$ is a one-way hash function;
  - computing J' such that $J'*(J_{SIGN})^{t'}*r'^E \equiv 1 \pmod{N}$, wherein r' is a random number and $1<r'<N$ and $J_{SIGN}$ is the public key for the collective signature;
  - sending J' and a selected polynomial B(x) to all stakeholders in a selected access set;
  - computing a partial result $J'^{Sk} \pmod{N}$ by each stakeholder, wherein $S_k=B(Z'_k) (0 \leq k<K)$, $Z'_k$ denotes the secret key held by each stakeholder; and
  - computing an intermediate value T as $T=r*r'*J'*\Pi k=1$ to K $J'^{Sk} \pmod{N}$,
  - wherein a three-tuple <M, t, T> constitutes the collective signature of the threshold number of stakeholders.

27. The system of claim 26 wherein the shares of quorum private keys $S_i$ and a quorum private key D bear a mathematical relation $\Sigma(0 \leq i<K)$ $Si \equiv D-1 \pmod{\lambda(N)}$, wherein $0 \leq i<K$, and K represents the threshold number, wherein $\lambda(N)$ is a Carmichael function of two strong primes p and q and $N=p*q$.

28. The system of claim 27 wherein the quorum private key D correlates with a public key E of the multilateral authorization quorum by a mathematical relation: $E*D \equiv 1 \pmod{\lambda(N)}$.

29. The system of claim 27 wherein a first one of the one or more broadcast polynomials for an access set $A_i$ is mathematically represented as $B_{Ai}(x)=\Sigma_{(0 \leq i<K)} C_i \Pi_{(0 \leq j<M \text{ and } j \notin Ai)}(Z_i-Z_j)\Pi_{(j \neq i \text{ and } j \in Ai)}(x-Z_j) \pmod{\lambda(N)}$ wherein $C_i=B_{Ai}(Z_i)/\Pi_{(0 \leq j<M \text{ and } j \neq i)}(Z_i-Z_j) \pmod{\lambda(N)/2}$, where M represents the total number of stakeholders and $Z_i$ represents the secret key of the i-th stakeholder.

30. The system of claim 27 further comprising means for verifying that the quorum private key and the shares of the quorum private key held by the threshold number of stakeholders have not been tampered with.

31. The system of claim 30 wherein the means for verifying further includes means for:
- providing a test value T corresponding to a broadcast polynomial B(x), the test value T being represented by $T=t^E \pmod{N}$ for the access set, wherein t is a predetermined number and E represents a public key of the multilateral authorization quorum and N is a predetermined integer;
- sending T and the broadcast polynomial B(x) to the stakeholders of the access set;
- computing a partial result value $T^{Sk} \pmod{N}$ by each stakeholder, wherein $S_k=B(Z'_k)$, and $Z'_k$ is the secret key held by each stakeholder;
- computing a value T' wherein $T'=T*\Pi_{k=1 \text{ to } K} T^{Sk} \pmod{N}$; and
- verifying that $T'=t$,
- wherein if T' equals t, the shares of the quorum private key held by the threshold number of stakeholders have not been tampered with.

32. The system of claim 26 further comprising means for providing an authorization utilizing the one or more broadcast polynomials and the secret keys held by the stakeholders.

33. The system of claim 32 further comprising means for:
- selecting at least one of the one or more broadcast polynomials based on the access set for which it was generated; and
- conducting one or more threshold cryptographic computations utilizing the at least one of the one or more broadcast polynomials and the secret keys.

34. The system of claim 32 wherein the multilateral authorization quorum is used for enrolling a new user in the computer network utilizing a Guillou-Quisquater public key security system, the enrolling requires approvals from the threshold number of stakeholders.

35. The system of claim 34 further comprising means for:
- generating, by the new user, a public key J based on one or more predetermined parameters;
- computing a value $R=r^E \pmod{N}$ wherein r is a random number between 1 and integer N, and E denotes a public exponent thereof;
- computing a value J' such that $R*J*J' \equiv 1 \pmod{N}$; wherein J denotes the public key chosen by the new user;
- sending J' and a selected broadcast polynomial B(x) to all stakeholders in an access set;
- computing a partial result $J'^{Sk} \pmod{N}$ by each stakeholder, wherein $S_k=B(Z'_k)$ $(0 \leq k<K)$, $Z'_k$ denotes the secret key held by each stakeholder;
- computing $B'=J'*\Pi_{k=1 \text{ to } K} J'^{Sk} \pmod{N}$;

sending B' to the new user; and computing a distinctive share B=B'*r (mod N) as a private key for the new user corresponding to the public key J.

36. The system of claim 26 further comprising means for verifying the generated collective signature.

37. The system of claim 26 further comprising means for adding at least one new stakeholder to the multilateral authorization quorum by generating new polynomials for added access sets.

38. The system of claim 37 wherein the means for generating includes, for the added access sets:

selecting a secret key for the at least one new stakeholder;

reselecting the shares of the quorum private key for all stakeholders to satisfy the condition that, for each access set, D−1 (mod λ(N)), wherein D represents the quorum private key and λ(N) represents a predetermined modulus; and recalculating the one or more polynomials using the shares of the quorum private key and the selected secret keys.

39. A method for implementing a multilateral authorization quorum in a computer network, the multilateral authorization quorum comprising a total number of stakeholders out of which a threshold number of stakeholders can provide a multilateral authorization, the stakeholders sharing a quorum private key, the method comprising:

determining one or more access sets, each containing the threshold number of stakeholders;

determining a share of the quorum private key held by each stakeholder in all of the one or more access sets, wherein the shares of the quorum private key held by the stakeholders in any one of the one or more access sets add up to a number directly related to the quorum private key, wherein the quorum private key is split among the stakeholders of the multilateral authorization quorum, thereby forming the multilateral authorization quorum;

determining one or more secret keys of the stakeholders for each of the one or more access sets; and generating one or more broadcast polynomials for each of the one or more access sets using the shares of the quorum private key and the one or more secret keys thereof, wherein the multilateral authorization quorum is used for enrolling a new user in the computer network utilizing a Guillou-Quisquater public key security system, the enrolling requires approvals from the threshold number of stakeholders, the method further comprising:

generating, by the new user, a public key J based on one or more predetermined parameters;

computing a value $R=r^E$(mod N) wherein r is a random number between 1 and integer N, and E denotes a public exponent thereof;

computing a value J' such that R*J*J'≡1 (mod N); wherein J denotes the public key chosen by the new user;

sending J' and a selected broadcast polynomial B(x) to all stakeholders in an access set;

computing a partial result $J'^{Sk}$(mod N) by each stakeholder, wherein $S_k=B(Z'_k)(0 \leq k<K)$, $Z'_k$ denotes the secret key held by each stakeholder;

computing $B'=J'*\Pi_{k=1 \, to \, K} J'^{Sk}$(mod N);

sending B' to the new user; and computing a distinctive share B=B'*r (mod N) as a quorum private key for the new user corresponding to the public key J.

40. A computer program product for implementing a multilateral authorization quorum in a computer network, the multilateral authorization quorum comprising a total number of stakeholders out of which a threshold number of stakeholders can provide a multilateral authorization, the stakeholders sharing a quorum private key, the computer program product stored on a computer-readable medium and comprising instructions for:

determining one or more access sets, each containing the threshold number of stakeholders;

determining a share of the quorum private key held by each stakeholder in all of the one or more access sets, wherein the shares of the quorum private key held by the stakeholders in any one of the one or more access sets add up to a number directly related to the quorum private key, wherein the quorum private key is split among the stakeholders of the multilateral authorization quorum, thereby forming the multilateral authorization quorum;

determining one or more secret keys of the stakeholders for each of the one or more access sets; and generating one or more broadcast polynomials for each of the one or more access sets using the shares of the quorum private key and the one or more secret keys thereof, wherein the threshold number of stakeholders in the multilateral authorization quorum collectively generate a collective signature for a message in the computer network utilizing a Guillou-Quisquater public key security system, the computer program product further comprising instructions for:

computing a value $R=r^E$(mod N) wherein r is a random number between 1 and integer N, and E denotes a public exponent thereof;

computing t=H (M, R) (mod E), wherein M represents the message being signed by the stakeholders and H(M, R) is a one-way hash function;

computing J' such that $J'*(J_{SIGN})^{t}*r'^E \equiv 1$ (mod N), wherein r' is a random number and 1<r'<N and $J_{SIGN}$ is the public key for the collective signature;

sending J' and a selected polynomial B(x) to all stakeholders in a selected access set;

computing a partial result $J'^{Sk}$(mod N) by each stakeholder, wherein $S_k=B(Z'_k)(0 \leq k<K)$, $Z'_k$ denotes the secret key held by each stakeholder; and computing an intermediate value T as $T=r*r'*J'*\Pi_{k=1 \, to \, K} J'^{Sk}$(mod N), wherein a three-tuple <M, t, T> constitutes the collective signature of the threshold number of stakeholders.

41. A system for implementing a multilateral authorization quorum in a computer network, the multilateral authorization quorum comprising a total number of stakeholders out of which a threshold number of stakeholders can provide a multilateral authorization, the stakeholders sharing a quorum private key, the system comprising:

a key share management center for determining one or more access sets, each containing the threshold number of stakeholders; for determining a share of the quorum private key held by each stakeholder in all of the one or more access sets, wherein the shares of the quorum private key held by the stakeholders in any one of the one or more access sets add up to a number directly related to the quorum private key; and for determining one or more secret keys of the stakeholders for each of the one or more access sets; and wherein the key share management center contains at least one memory, wherein the key share management center generates one or more broadcast polynomials for each of the one or more access sets using the shares of the quorum private key and the one or more secret keys thereof,
wherein the multilateral authorization quorum is used for enrolling a new user in the computer network utilizing a Guillou-Quisquater public key security system, the enrolling requires approvals from the threshold number of stakeholders, the system further comprising means for:

generating, by the new user, a public key J based on one or more predetermined parameters;

computing a value $R=r^E \pmod{N}$ wherein r is a random number between 1 and integer N, and E denotes a public exponent thereof;

computing a value J' such that $R*J*J' \equiv 1 \pmod{N}$; wherein J denotes the public key chosen by the new user;

sending J' and a selected broadcast polynomial B(x) to all stakeholders in an access set;

computing a partial result $J'^{Sk} \pmod{N}$ by each stakeholder, wherein $S_k = B(Z'_k)(0 \leq k < K)$, $Z'_k$ denotes the secret key held by each stakeholder;

computing $B' = J' * \Pi k=1 \text{ to } K \; J'^{Sk} \pmod{N}$;

sending B' to the new user; and computing a distinctive share $B = B'*r \pmod{N}$ as a private key for the new user corresponding to the public key J.

* * * * *